US011641411B2

(12) United States Patent
Agassounon et al.

(10) Patent No.: US 11,641,411 B2
(45) Date of Patent: May 2, 2023

(54) INTERFACING MODULES OF A MUNITION TO A STANDARD MUNITION NETWORK

(71) Applicant: Textron Systems Corporation, Hunt Valley, MD (US)

(72) Inventors: William Agassounon, North Reading, MA (US); Robert Newcomb Litchfield, Litchfield, NH (US); Andrew Kevin McCann, Graveland, MA (US)

(73) Assignee: Textron Systems Corporation, Hunt Valley, MD (US)

( * ) Notice: Subject to any disclaimer, the term of this patent is extended or adjusted under 35 U.S.C. 154(b) by 314 days.

(21) Appl. No.: 17/006,104

(22) Filed: Aug. 28, 2020

(65) Prior Publication Data

US 2021/0067611 A1  Mar. 4, 2021

Related U.S. Application Data

(60) Provisional application No. 62/893,372, filed on Aug. 29, 2019.

(51) Int. Cl.
*H04L 69/18* (2022.01)
*F41G 7/00* (2006.01)
(Continued)

(52) U.S. Cl.
CPC .............. *H04L 69/18* (2013.01); *F41G 7/007* (2013.01); *H04L 12/5601* (2013.01);
(Continued)

(58) Field of Classification Search
CPC ..... H04L 69/08; H04L 69/18; H04L 12/5601; H04L 12/5691; H04L 67/12; H04L 2012/563; F41G 7/007
See application file for complete search history.

(56) References Cited

U.S. PATENT DOCUMENTS 5,096,139 A * 3/1992 Feld .................. F41G 7/30
244/3.1
6,349,898 B1 * 2/2002 Leonard ............. F41G 7/007
244/3.14
(Continued)

OTHER PUBLICATIONS

Space Dynamics Laboratory; MOSA; downloaded Aug. 1, 2019 from: https://www.sdl.usu.edu/downloads/mosa.pdf; 2 pages.

*Primary Examiner* — Jenee Holland
(74) *Attorney, Agent, or Firm* — BainwoodHuang

(57) ABSTRACT

A technique of managing communications among multiple modules of a munition includes receiving, by a first module of the munition, a first set of messages from a second module of the munition. The first set of messages is received in a first protocol used for communicating among the modules of the munition over a computer network. The technique further includes translating, by an interface assembly of the first module, the first set of messages in the first protocol into a second set of messages in a second protocol. The second protocol is a native protocol of the first module and is different from the first protocol. The technique still further includes providing the second set of messages from the interface module to an operational component of the first module, the operational component then responding to the second set of messages for performing a function of the munition.

17 Claims, 5 Drawing Sheets

(51) Int. Cl.
    *H04L 12/54*     (2022.01)
    *H04L 67/12*     (2022.01)
    *H04L 12/70*     (2013.01)

(52) U.S. Cl.
    CPC .......... *H04L 12/5691* (2013.01); *H04L 67/12* (2013.01); *H04L 2012/563* (2013.01)

(56) References Cited

U.S. PATENT DOCUMENTS

| | | | | |
|---|---|---|---|---|
| 6,598,828 B2* | 7/2003 | Fiebick | .................. | F41G 7/007 |
| | | | | 73/167 |
| 7,515,998 B1* | 4/2009 | Stiffler | .................. | G01S 7/003 |
| | | | | 244/75.1 |
| 10,066,892 B1* | 9/2018 | Dacier | ..................... | F41A 9/40 |
| 10,145,661 B2 | 12/2018 | Miller et al. | | |
| 10,337,809 B2 | 7/2019 | Shipley et al. | | |
| 10,408,567 B1* | 9/2019 | Carver, II | ................ | F41F 3/042 |
| 10,548,928 B2 | 2/2020 | Grompone et al. | | |
| 10,619,954 B2 | 4/2020 | Shipley et al. | | |
| 10,641,561 B2 | 5/2020 | Shipley et al. | | |
| 2003/0018840 A1* | 1/2003 | Chandler | .............. | H01R 29/00 |
| | | | | 710/100 |
| 2004/0013131 A1* | 1/2004 | Owens | ................ | H04L 27/2601 |
| | | | | 370/466 |
| 2004/0015630 A1* | 1/2004 | Boolos | .............. | H04L 12/40169 |
| | | | | 710/300 |
| 2005/0183570 A1* | 8/2005 | McMahon | .............. | F42C 15/40 |
| | | | | 89/1.811 |
| 2005/0243836 A1* | 11/2005 | Truitt | .................... | H04L 69/168 |
| | | | | 370/395.52 |
| 2007/0235584 A1* | 10/2007 | Corman | .................. | H04L 69/08 |
| | | | | 244/75.1 |
| 2008/0177888 A1* | 7/2008 | Catalfano | ............... | H04L 69/08 |
| | | | | 709/230 |
| 2009/0109063 A1* | 4/2009 | Grimshaw | .............. | H04L 69/08 |
| | | | | 340/945 |
| 2009/0138097 A1* | 5/2009 | Rinaldi | ............... | H04L 41/0226 |
| | | | | 707/999.009 |
| 2011/0029681 A1* | 2/2011 | Lee | ........................ | A63F 13/352 |
| | | | | 709/230 |
| 2011/0089237 A1* | 4/2011 | Morocz | ..................... | F41F 3/04 |
| | | | | 235/400 |
| 2012/0214137 A1* | 8/2012 | Goree | .................. | F41A 17/063 |
| | | | | 434/19 |
| 2015/0082975 A1* | 3/2015 | Huber | .................. | F42C 17/04 |
| | | | | 89/1.11 |
| 2015/0089099 A1* | 3/2015 | Huber | .................... | G06F 13/16 |
| | | | | 710/105 |
| 2015/0370752 A1* | 12/2015 | Hammel | ............... | G06F 13/4282 |
| | | | | 710/105 |
| 2017/0244813 A1* | 8/2017 | Hammel | ............... | B64D 47/02 |
| 2017/0286654 A1* | 10/2017 | Nicoll | .................... | F41A 17/08 |
| 2018/0198881 A1* | 7/2018 | Michaux | .............. | H04L 67/565 |
| 2019/0093993 A1* | 3/2019 | Mortensen | .............. | F42C 17/04 |
| 2019/0277603 A1* | 9/2019 | Livingstone | ............. | F41G 9/02 |
| 2020/0072587 A1* | 3/2020 | Bailey | ..................... | B64D 7/08 |

\* cited by examiner

INTERFACING MODULES OF A MUNITION TO A STANDARD MUNITION NETWORK

CROSS-REFERENCE TO RELATED APPLICATIONS

This application claims the benefit of U.S. Provisional Application No. 62/893,372, filed Aug. 29, 2019, the contents and teachings of which are incorporated by reference herein in their entirety.

STATEMENT REGARDING FEDERALLY SPONSORED RESEARCH OR DEVELOPMENT

This invention was made with government support under Contract FA8651-16-D-0284 awarded by the U.S. Air Force Research Lab (AFRL) Munitions Directorate, Eglin, Fla. The government has certain rights in the invention.

BACKGROUND

Munitions such as smart bombs, guided missiles, torpedoes, and surveillance systems typically contain multiple subsystems. The subsystems may include, for example, nose modules, navigation modules, control actuation modules, and communication modules, to name but a few. Such modules may interconnect within a munition to ensure proper coordination, which enables the munition to achieve its design objectives. In a common arrangement, a module employs a serial bus, such as RS-232, RS-422, or the like, for supporting point-to-point, daisy chain, or multidrop communications between or among modules.

SUMMARY

Unfortunately, conventional communication schemes for modules within munitions lack standardization. One module might employ RS-232 according to one protocol, whereas another module might employ RS-422 according to another protocol. One or both protocols may be proprietary. As a result, it can be difficult to swap one module for another, e.g., for performing upgrades and/or repairs. Significant time and effort may be needed to integrate a new module into an existing munition. Greater standardization would therefore be desirable.

Government agencies have made progress in this regard by defining a modular open systems approach (MOSA). However, MOSA does not typically accommodate legacy equipment, which was not initially designed to meet MOSA standards. Such legacy equipment is therefore at substantial risk of early obsolescence.

Deficiencies in the prior art may be addressed at least in part with an improved technique of managing communications among multiple modules of a munition interconnected using a computer network. The technique includes receiving, by a first module of the munition, a first set of messages from a second module of the munition. The first set of messages is received in a first protocol, the first protocol being used for communicating among the modules of the munition over the computer network. The technique further includes translating, by an interface assembly of the first module, the first set of messages in the first protocol into a second set of messages in a second protocol. The second protocol is a native protocol of the first module and is different from the first protocol. The technique still further includes providing the second set of messages from the interface module to an operational component of the first module, the operational component then responding to the second set of messages for performing a function of the munition.

According to some examples, the controller is configured to aggregate incoming data from multiple packets arriving over the computer network and to convey the aggregated incoming data in a message of a specified message type to a module of the munition in the module protocol of that module. According to some variants, the database stores a value that indicates a number of packets to be accumulated for the message type, and the controller aggregates the number of packets responsive to reading the value from the database.

According to some examples, the controller is further configured to aggregate outgoing data from multiple packets arriving from the module according to the module protocol and to send the aggregated outgoing data over the network in an outgoing message of a specified outgoing message type in the standard protocol. According to some variants, the database stores a value that indicates a number of packets to be accumulated for the outgoing message type. The controller aggregates the number of packets responsive to reading the value from the database.

According to some examples, the computer network is an Ethernet network and the standard protocol is an OSA (Open System Architecture) protocol implemented over Ethernet.

According to some examples, the module protocol is implemented over a serial bus. In various examples, the serial bus may be RS-232 or RS-422.

According to some examples, the interface assembly further includes level translation circuitry configured to convert between logic levels of the module and logic levels of the computer network.

According to some examples, the controller includes a processor. In some variants, the processor includes a Beagle-Bone® open hardware computer. In other variants, the processor includes a Raspberry Pi. In some examples, the processor runs a real-time operating system (RTOS), such as a real-time version of Linux. In some examples, the processor includes both a serial reader and a serial writer.

According to some examples, a first module in the munition is configured to communicate with a second module in the munition using a publication/subscription (Pub/Sub) model that specifies which modules are enabled to communicate with each other.

According to some variants, a configuration file is provided for a particular module in the munition. To replace the particular module with a different module, the configuration file is replaced with a new configuration file for the different module.

Certain embodiments are directed to methods, devices, and computer program products for interfacing modules of a munition to a computer network within the munition. Other embodiments are directed to a munition that includes modules and employs interface assemblies for facilitating communications among the modules. Still other embodiments are directed to methods for upgrading and/or repairing munitions.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for interfacing modules in a munition employs a standard computer network that interconnects the modules and enables communication among the modules using a standard protocol. Each of the modules (or some subset thereof) includes an interface assembly having a controller configured to translate between the standard protocol and a module protocol of the module. A database accessible by the controller stores translation data. By performing a lookup into the database, the controller acquires portions of the translation data that enable the controller to translate a set of messages in the standard protocol to a corresponding set of messages in the module protocol, and vice-versa. The improved technique thus enables integration of legacy modules and other modules into a munition that uses the standard protocol for communicating among modules, leveraging the capabilities of the legacy modules and preventing their early obsolescence. Further, the improved technique eases the burden of swapping an old module for a new type of module designed for a different protocol, as replacement can be effected merely by providing a new interface assembly for the new module. Replacement is even simpler if the new type of module is designed for the standard protocol, as no new interface assembly may be needed.

Figure 1:
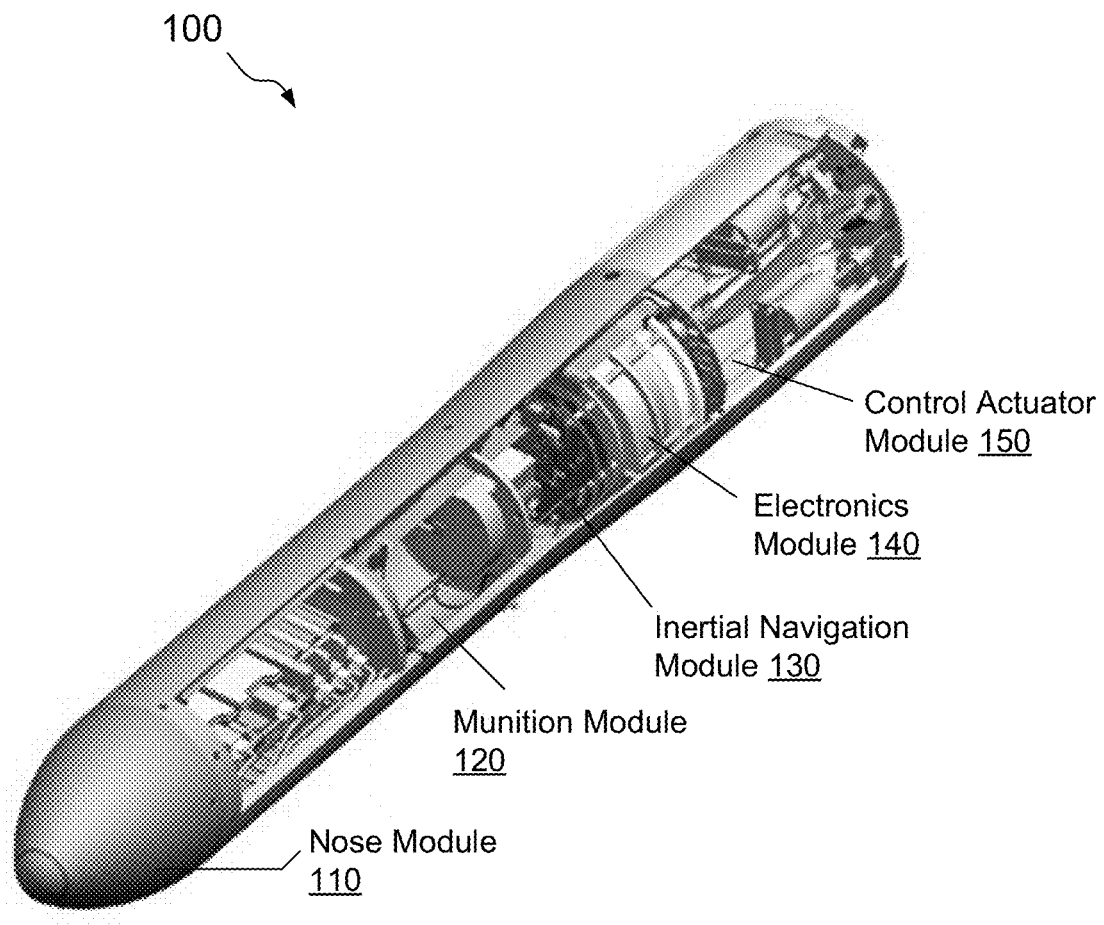
FIG. 1 is a perspective view of an example munition in which embodiments of the improved technique can be practiced.

FIG. 1 shows an example munition 100 in which embodiments of the improved technique hereof can be practiced. As shown, munition 100 includes a number of modules, such as nose module 110, munition module 120, inertial navigation module 130, electronics module 140, and control actuator module 150. The munition 100 may include other modules besides those shown, or it may include fewer modules. The example shown is merely illustrative. The modules included in munition 100 operate in coordination to enable the munition 100 to achieve its design objectives.

Figure 2:
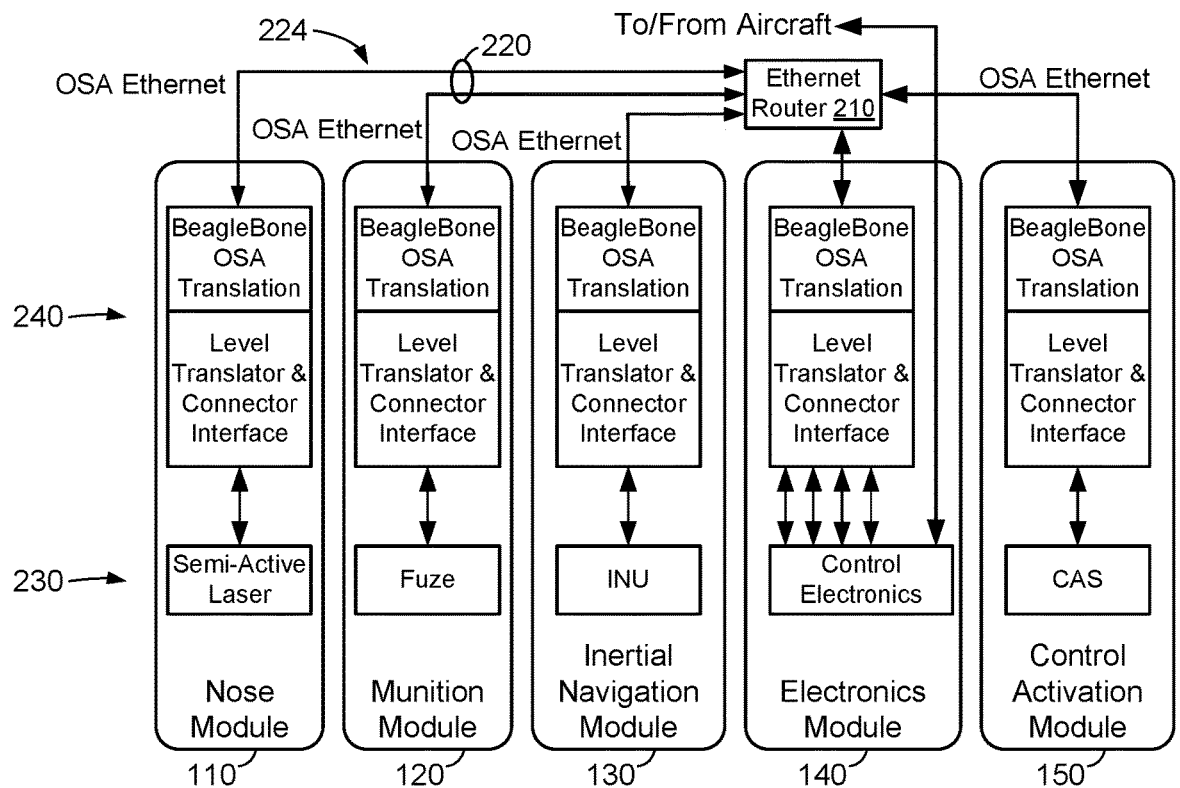
FIG. 2 is a block diagram of an example electronic system within the munition of FIG. 1.

FIG. 2 shows an electronic view of munition 100 of FIG. 1, in which the munition 100 is seen to include the modules 110, 120, 130, 140, and 150, as well as a router 210 and network cables 220, which together form a computer network 224. In an example, the router 210 is an Ethernet router and the network cables 220 are Ethernet cables. Other standardized network protocols may be used, however. Each of the modules 110, 120, 130, 140, and 150 connects to the router 210, enabling each module to communicate with each of the other modules. Each of the modules 110, 120, 130, 140, and 150 includes an operational component 230. For example, the nose module 110 includes a semi-active laser, the munition module 120 includes a fuze or other ESAD (Electronic Safe and Arm Device), the inertial navigation module 130 includes an inertial navigation unit (INU), the electronics module 140 includes control electronics, and the control actuation module 150 includes a control actuation system (CAS). Each of the modules 110, 120, 130, 140, and 150 further includes an interface assembly 240.

Figure 3:
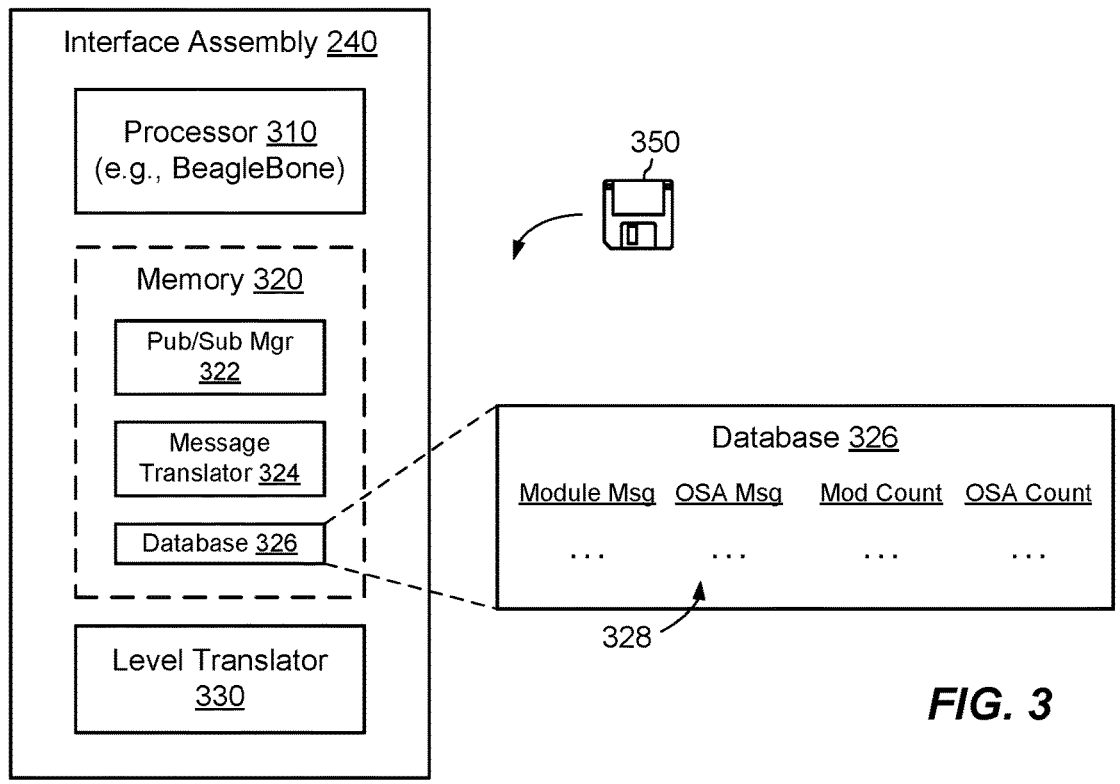
FIG. 3 is a block diagram of an example interface assembly used by each of the modules of FIG. 1.

FIG. 3 shows the interface assembly 240 in additional detail. As shown, interface assembly 240 includes a processor 310, such as one or more processing chips and/or assemblies, memory 320, and level translator 330. In a particular example, the processor 310 is implemented using a BeagleBone® open hardware computer, which is provided as a single-board computer. In another example (not shown), the processor 310 is implemented using a Raspberry Pi. These are merely examples, however. The level translator 330 is configured to shift logic levels between those used by the processor 310 (e.g., 3.3 v) and those used by the respective component 230 (e.g., +/−5 v). The memory 320 may include both volatile memory (e.g., RAM) and non-volatile memory, such as one or more magnetic disk drives, solid state drives, or the like. In some examples, the memory is at least partially provided as part of the processor 310, e.g. on the BeagleBone board itself. The processor 310 and the memory 320 together form a controller, which is constructed and arranged to carry out various methods as described herein. The memory 320 may include a variety of software constructs realized in the form of executable instructions. When the executable instructions are run by the processor 310, the processor 310 carries out the operations of the software constructs. Such executable instructions may be embodied as a computer program product 350, which includes one or more non-transitory, computer-readable storage media, such as one or more magnetic disks, magnetic tapes, compact disks, DVDs, optical disks, flash drives, solid state drives, SD (Secure Digital) chips, Application Specific Integrated Circuits (ASICs), Field Programmable Gate Arrays (FPGAs), and/or the like. Any number of computer-readable media may be used. The media may be encoded with instructions which, when executed by processor 310, perform the method or methods described herein. Such media may be considered articles of manufacture or machines, and may be transportable from one machine to another. Although certain software constructs are specifically shown and described, it is understood that each of the memories 130a and 130b typically includes many other software components, which are not shown, such as an operating system, various applications, processes, and daemons.

As further shown in FIG. 3, the memory 320 "includes," i.e., realizes by execution of software instructions, a publication/subscription (pub/sub) manager 322, a message translator 324, and a database 326. The pub/sub manager 322 is configured to manage communications with other modules in the munition 100 using a publication/subscription model. For example, the pub/sub manager 322 enables inbound communications from subscribed modules and/or messages but blocks inbound communications from non-subscribed modules and/or messages. To this end, the pub/sub manager 322 may include a routing table of allowed and blocked routes. Allowed and blocked routes may be established based on a priori programming and/or based on a discovery procedure that operates at power-up, for example. In various examples, the pub/sub manager 322 is implemented using third-party software, such as Space Plug-and-play Architecture and Modular Open Network ARCHitecture (SPA/MONARCH), available from Space Dynamics Laboratory, Utah State University Research Foundation, or RTI Connext DDS, available from Real Time Innovations (www.rti.com).

The message translator 324 is configured to translate messages arriving from the router 210 from other modules into messages in the native protocol of the respective component 230 (e.g., RS-232 or RS-422). The message translator 324 is likewise configured to translate messages going the other way, i.e., messages arriving in the native protocol of the respective component 230 into messages compatible with the other modules. The messages compatible with the other modules may be provided as OSA (Open System Architecture) messages. Such messages are defined by a standard protocol which is intended to apply across different makes and models of modules. Additional information about OSA may be found online at http://acqnotes.com/acqnote/careerfields/modular-open-systems-approach.

The database 326 includes translation data 328 for enabling the message translator 324 to translate messages back and forth between the standard protocol (e.g., OSA) and the native protocol of the respective component 230. For example, as shown to the right of FIG. 3, the database 326 includes fields that associate module messages (Module Msg) in the native protocol of the component 230 with corresponding OSA messages (OSA Msg) and corresponding counts (Mod Count and OSA Count). Each count indicates how many packets are needed to send or receive the respective message. For example, if Mod Count is 3 and OSA Count is 2, then 2 packets are needed in the standard (OSA) protocol to transmit the same message as 3 packets in the native protocol.

To reduce cost, the memory 320 may further include an open-source operating system (not shown), such as Linux. In some examples, a real-time operating system (RTOS) version of Linux is used.

Various operational aspects of the munition 100 will now be described with reference to FIGS. 4-6, which respectively show example methods 400, 500, and 600 that may be carried out in connection with the munition 100. The methods 400, 500, and 600 are typically performed, for example, by the software constructs described in connection with FIG. 3, which reside in the memory 320 of the interface assembly 240 and are run by the processor 310. The various acts of methods 400, 500, and 600 may be ordered in any suitable way. Accordingly, embodiments may be constructed in which acts are performed in orders different from those illustrated, which may include performing some acts simultaneously.

Figure 4:
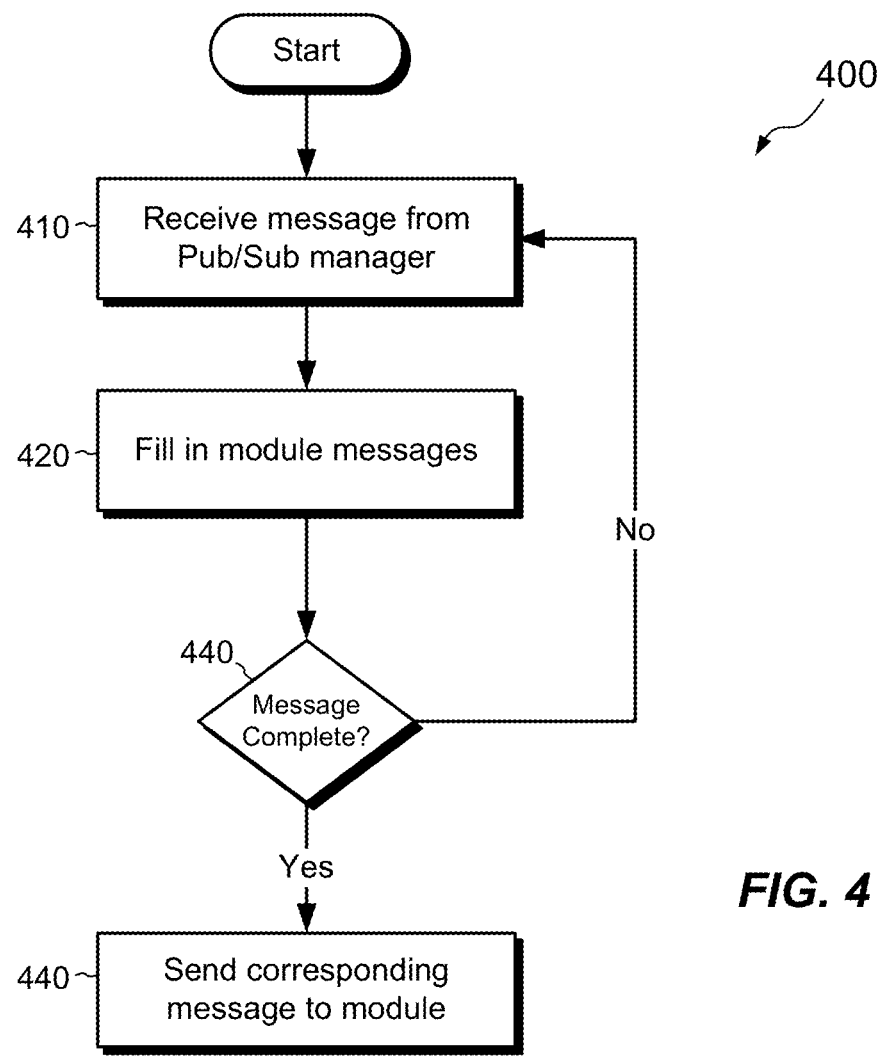
FIG. 4 is a flowchart of an example method of translating a set of standard protocol messages to a corresponding set of module protocol messages.

FIG. 4 shows an example method 400 of processing a message that arrives over the computer network 224. In an example, the message arrives in the standard protocol, such as OSA.

At 410, the pub/sub manager 322 receives the OSA message. If the message is subscribed-to or originates from a subscribed module, the pub/sub manager 322 passes the message to the message translator 324.

At 420, the message translator 324 fills in module messages by aggregating data received in respective packets arriving over the network 224.

At 440, the message translator 324 determines whether the OSA message is complete. For example, the message translator 324 performs a lookup into the database 326 for the received OSA message type and obtains the corresponding OSA Count value. The message at 440 is complete when the number of packets specified by the OSA Count value has been received.

At 440, the message translator 324 accesses the corresponding Module Msg from the database 326 and forwards the module message to the module component 230 in the native protocol of that module component 230.

Figure 5:
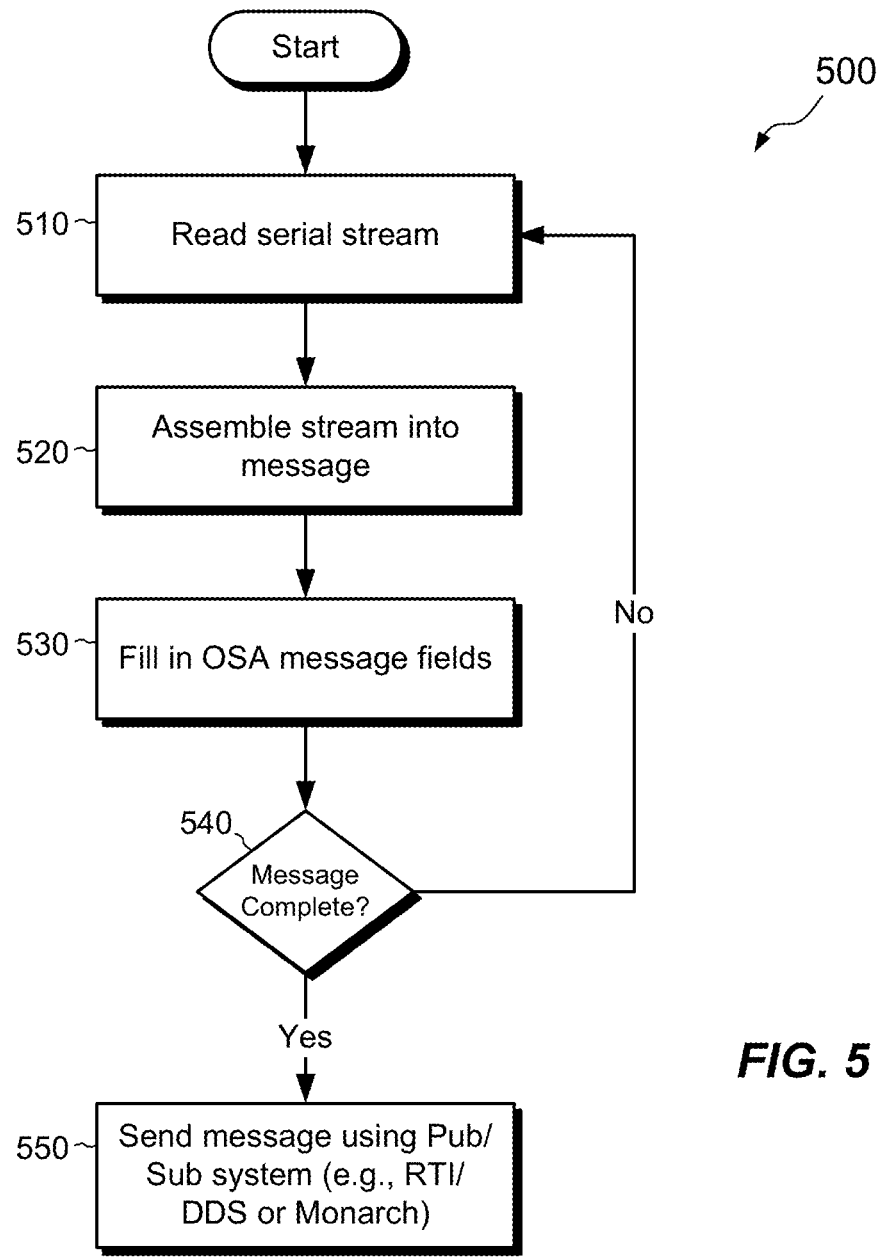
FIG. 5 is a flowchart of an example method of translating a set of module protocol messages to a corresponding set of standard protocol messages.

FIG. 5 shows an example method 500 of translating a message from a native module protocol into a corresponding message in the standard protocol (OSA), e.g., for transmission over the network 224 to a specified module.

At 510, the message translator 324 reads a serial stream from the module component 230. At 520, the message translator 324 assembles the stream into a message. For example, the message translator 324 performs a lookup into the database 326 of the Module Msg and obtains the corresponding OSA Msg, Mod Count, and OSA Count. The message is fully assembled when the "Mod Count" number of packets has been received.

At 530, the message translator 324 fills in the OSA message fields, e.g., based on the corresponding OSA message and OSA Count.

At 540, the message translator 324 tests whether the message is complete, meaning that "OSA Count" message fields have been filled. If not, operation returns to 510, whereupon more of the message stream is read and operation repeats. If yes, the OSA message is passed to the pub/sub manager 324 and over the network 224 to the specified module(s).

Figure 6:
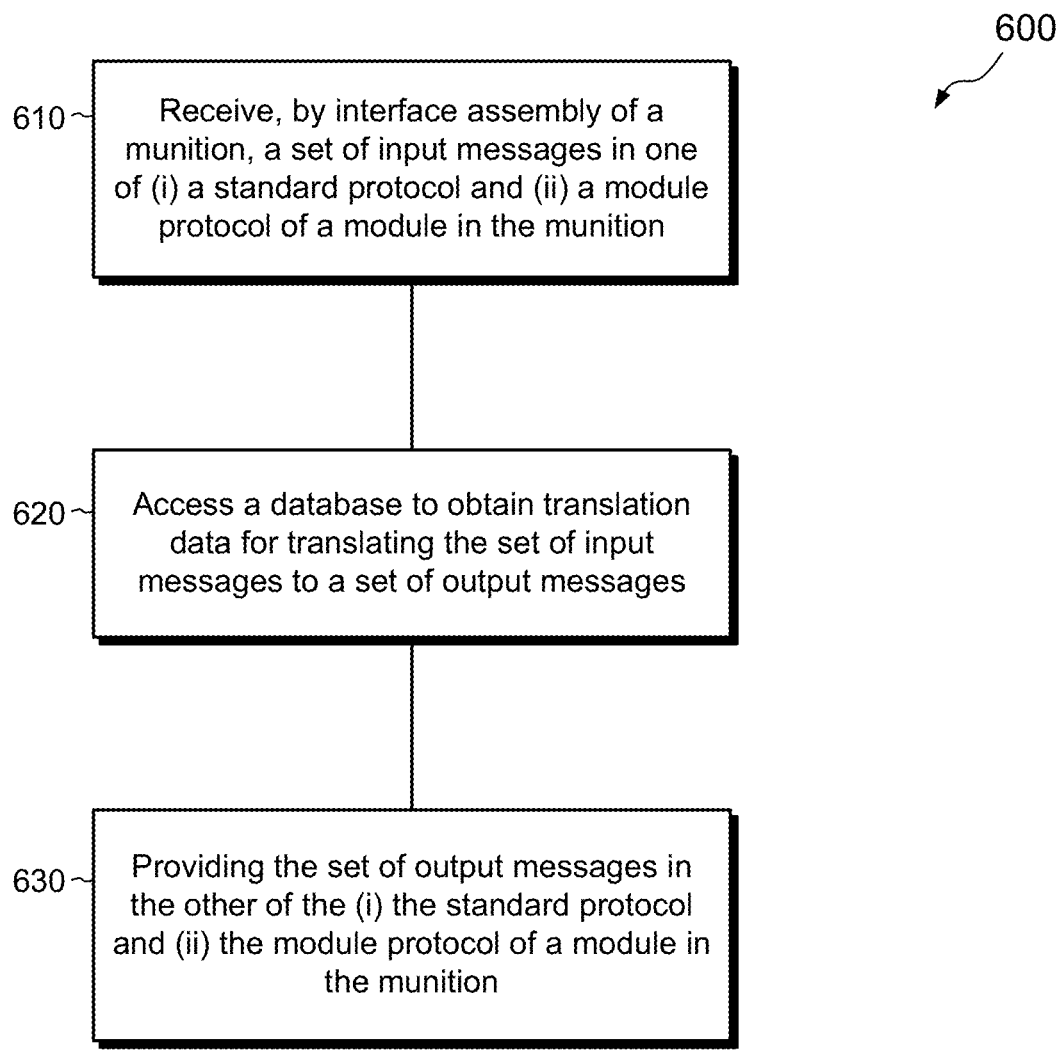
FIG. 6 is a flowchart of an example method that may be carried out in the munition of FIG. 1.

FIG. 6 shows an example method 600 for interfacing modules of a munition and serves as an overview of certain features described above.

At 610, an interface assembly 240 of a module (e.g., 110, 120, 130, 140, or 150) receives a set of input messages in one of a standard protocol (e.g., OSA) and a module protocol (e.g., a proprietary protocol over a serial bus).

At 620, the interface assembly 240 accesses a database 326 to obtain translation data 328 for translating the set of input messages into a corresponding set of output messages.

At 630, the interface assembly 240 provides the set of output messages in the other of the standard protocol (e.g., OSA) and the module protocol (e.g., proprietary protocol over a serial bus).

An improved technique has been described which employs a standard computer network that interconnects multiple modules within a munition and enables communication among such modules using a standard protocol. Each of the modules (or some subset thereof) includes an interface assembly having a controller configured to translate between the standard protocol and a module protocol of the module. A database accessible by the controller stores translation data. By performing a lookup into the database, the controller acquires portions of the translation data that enable the controller to translate a set of messages in the standard protocol to a corresponding set of messages in the module protocol, and vice-versa. The improved technique thus enables integration of legacy modules and other modules into a munition that uses the standard protocol for communicating among modules, leveraging the capabilities of the legacy modules and preventing their early obsolescence.

Having described certain embodiments, numerous alternative embodiments or variations can be made. For example, although embodiments have been described that involve Ethernet, embodiments are not limited to Ethernet but may include other standard network and/or bus protocols, such as MIL STD 1553. Also, although OSA has been described herein as a standard protocol, embodiments are not limited to OSA but may rather include any standardized protocol for communicating with modules of a munition.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

Additional Information:

Traditional guided munition designs utilize proprietary, hardwired interconnects of subsystems that render munition upgrade, modification, and mission flexibility time consuming and costly. A modular open architecture guided munition design supports plug-and-play of subsystem technologies. A critical enabler of this plug-and-play characteristic is the underlying messaging (or data bus) framework, which allows subsystems of the munition to communicate and transfer data effectively and efficiently. Disclosed embodiments utilize an Ethernet-based, multipoint serial and point-to-point serial messaging interfaces to achieve plug-and-play, interchangeability of subsystems and fast data transfer across the network of subsystems. Such embodiments provide a design for translation devices and methods that enable systems to meet open system architecture (OSA) standards.

An example modular design includes:

(1) A nose module that entails a seeker module, which may be of different modalities, including radio frequency (RF), electro-optical, GPS, and semi-active laser;

(2) A munition module that entails a fuze and electronic safe and arm (ESAD);

(3) An inertial navigation module that entails an inertial navigation unit (INU);

(4) An electronic module that entails a processor for electronic control; and (5) A control actuation module that entails a control actuation system (CAS) of horizontal and vertical tails, fins and canards.

Each module is equipped with an open system architecture (OSA) translator and an interface connector. A common data bus implemented as Ethernet router, and a multipoint serial bus, or a point-to-point serial bus, is connected to the modules through their respective OSA translators. The seeker, the fuze module, the INU, the Control Electronics processor, and the CAS are connected through the OSA translator of the respective module via a level translator and connector interface.

The logical interface of the design may be arranged such that each module is aware of and has access to all other modules' data; for example, each module knows which module to send data to via a Publish/Subscribe (Pub/Sub or Producer-Consumer) messaging pattern. Also, each module may store Quality of Service (QoS) data for all other modules and all Pub/Sub messaging topics.

In prior designs, interconnections between modules of a modular guided munition are hard-wired or fixed and/or do not utilize an Ethernet bus or router, a multipoint bus, or a point-to-point bus, and do not include the corresponding OSA translators. Although they are module, these designs are not flexible and do not enable swapping and replacement of subsystems seamlessly.

With the improved technique as described herein, subsystems are readily swappable and interchangeable, making it easy to create a new guided munition or operational capability by replacing subsystems in a plug-and-play fashion.

What is claimed is:

1. A method of managing communications among multiple modules of a munition, the modules interconnected using a computer network, the method comprising:

receiving, by a first module of the munition, a first set of messages from a second module of the munition, the first set of messages received in a first protocol, the first protocol used for communicating among the modules of the munition over the computer network;

translating, by an interface assembly of the first module, the first set of messages in the first protocol to a second set of messages in a second protocol, the second protocol being a native protocol of the first module and being different from the first protocol, said translating including accessing a database to obtain translation data for translating the first set of messages to the second set of messages; and providing the second set of messages from the interface module to an operational component of the first module, the operational component then responding to the second set of messages for performing a function of the munition.

2. The method of claim 1, further comprising the interface assembly of the first module aggregating incoming data from multiple packets arriving over the computer network and conveying, in the second protocol, the aggregated incoming data in a message of a specified message type to the operational component of the first module.

3. The method of claim 2, further comprising the database storing a value that indicates a number of packets to be accumulated for the specified message type in the first protocol, wherein aggregating the incoming data includes aggregating the number of packets specified by the value stored in the database.

4. The method of claim 3, further comprising the database storing a second value that indicates a number of packets to be provided in a message of the specified type in the second protocol, and wherein the message provided to the operational component includes the number of packets specified by the second value.

5. The method of claim 2, further comprising:
generating, by the operational component of the first module of the munition, a third set of messages in the second protocol;
translating, by the interface assembly of the first module, the third set of messages in the second protocol to a fourth set of messages in the first protocol; and
transmitting the fourth set of messages over the computer network to another module of the munition.

6. The method of claim 5, further comprising:
aggregating, by the interface assembly, outgoing data from multiple packets arriving from the operational component according to the second protocol; and
sending, in the first protocol, the aggregated outgoing data over the network in an outgoing message of a specified outgoing message type.

7. The method of claim 5, further comprising the database storing a third value that indicates a number of packets to be provided in a message of the specified outgoing message type in the first protocol, and wherein the method further comprises aggregating a number of packets responsive to reading the third value from the database.

8. The method of claim 2, wherein the computer network is an Ethernet network and the first protocol is an OSA (Open System Architecture) protocol implemented over Ethernet.

9. The method of claim 2, further comprising conducting communications between the first module and other modules of the munition using a publication/subscription (Pub/Sub) model that specifies which modules are enabled to communicate with each other and which are blocked from communicating with each other.

10. A munition, comprising:
multiple modules interconnected via a computer network, the modules including a first module and a second module, the first module including control circuitry that includes a processor and memory, the control circuitry constructed and arranged to:
receive a first set of messages from the second module, the first set of messages received in a first protocol, the first protocol used for communicating among the modules of the munition over the computer network, the computer network being an Ethernet network and the first protocol being an OSA (Open System Architecture) protocol implemented over Ethernet;
translate, by an interface assembly of the first module, the first set of messages in the first protocol to a second set of messages in a second protocol, the second protocol being a native protocol of the first module and being different from the first protocol; and
provide the second set of messages from the interface module to an operational component of the first module, the operational component then responding to the second set of messages for performing a function of the munition.

11. The munition of claim 10, further comprising a serial bus communicatively connected between the interface assembly of the first module and the operational component of the first module.

12. The munition of claim 11, wherein the interface assembly includes level translation circuitry configured to convert between logic levels of the first module and logic levels of the computer network.

13. A computer program product including a set of non-transitory, computer-readable media having instructions which, when executed by control circuitry, cause the control circuitry to perform a method of managing communications among multiple modules of the munition, the modules interconnected using a computer network, the method comprising:
receiving, by a first module of the munition, a first set of messages from a second module of the munition, the first set of messages received in a first protocol, the first protocol used for communicating among the modules of the munition over the computer network;
translating, by an interface assembly of the first module, the first set of messages in the first protocol to a second set of messages in a second protocol, the second protocol being a native protocol of the first module and being different from the first protocol, said translating including accessing a database to obtain translation data for translating the first set of messages to the second set of messages; and
providing the second set of messages from the interface module to an operational component of the first module, the operational component then responding to the second set of messages for performing a function of the munition.

14. The computer program product of claim 13, further comprising the interface assembly of the first module aggregating incoming data from multiple packets arriving over the computer network and conveying, in the second protocol, the aggregated incoming data in a message of a specified message type to the operational component of the first module.

15. The computer program product of claim 14, further comprising the database storing a value that indicates a number of packets to be accumulated for the specified message type in the first protocol, wherein aggregating the incoming data includes aggregating the number of packets specified by the value stored in the database.

16. The computer program product of claim 14, further comprising the database storing a second value that indicates a number of packets to be provided in a message of the specified message type in the second protocol, and wherein the message provided to the operational component includes the number of packets specified by the second value.

17. The computer program product of claim 13, further comprising conducting communications between the first module and other modules of the munition using a publication/subscription (Pub/Sub) model that specifies which modules are enabled to communicate with each other and which are blocked from communicating with each other.

* * * * *